C. W. STAFFORD.
Mole Plow.
No. 29,201. Patented July 17, 1860.
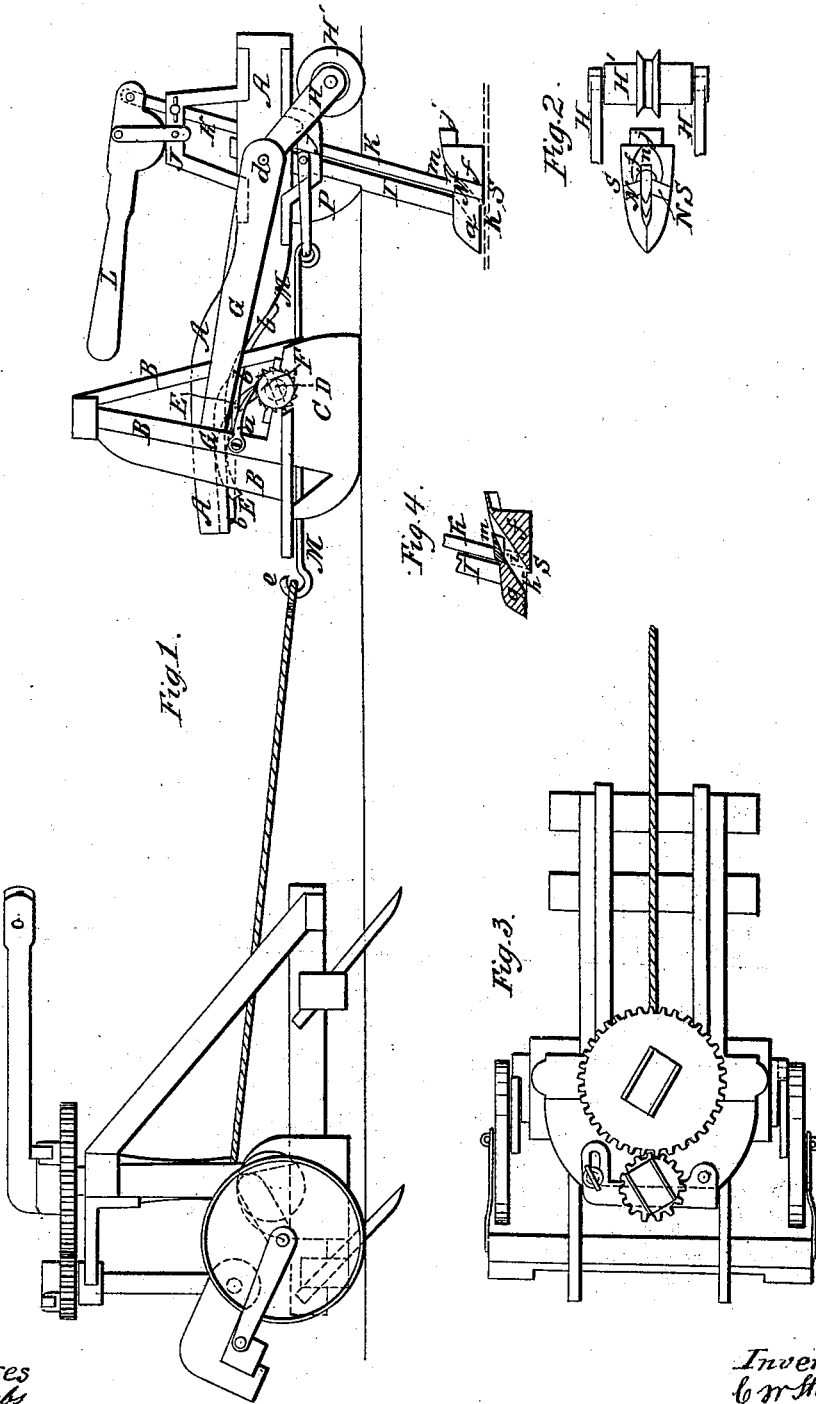

UNITED STATES PATENT OFFICE.

C. W. STAFFORD, OF BURLINGTON, IOWA.

IMPROVEMENT IN MOLE-PLOWS.

Specification forming part of Letters Patent No. 29,201, dated July 17, 1860.

*To all whom it may concern:*

Be it known that I, C. W. STAFFORD, of Burlington, in the county of Des Moines and State of Iowa, have invented certain new and useful Improvements in Mole-Plows; and I do hereby declare that the following is a full, clear, and exact description thereof, reference being had to the accompanying drawings, forming a part of this specification, in which—

Figure 1 shows a side elevation of the mole-plow, supposed to be in operation. In front of it is represented a capstan for driving the plow through the earth. Fig. 2, a plan view of the tooth and flanged pressing-roller; Fig. 3, merely a top view of the capstan; Fig. 4, a vertical longitudinal section taken through the mole-tooth, showing its peculiarities.

Similar letters of reference indicate corresponding parts in the several figures.

This invention is an improvement in plows for underground-draining purposes, for draining off surface-water, and for rendering wet clay soils profitable as arable land.

My invention and improvement consists in a novel mode of supporting, bracing, and operating the mole-tooth, with its attachments, for the purpose of regulating its depth below the surface of the ground and to run it into or out of the ground at pleasure, as will be hereinafter described and represented.

To enable those skilled in the art to fully understand my invention, I will proceed to describe its construction and operation.

In the drawings, A represents the beam, which is made of a suitable length and strength and curved upward at its forward end, so that the rear end may be brought nearer to the surface of the ground than the front end. The front end passes through a strongly-braced frame, B, that is placed upon and secured to a sled, C, transversely through which frame passes a large and powerful shaft, D, that carries a curved elevating and depressing cam, E, on which the front end of the beam A rests. On one side, outside of the frame, a ratchet-wheel and drum, F, is keyed, and on the tooth of the ratchet-wheel a dog or pawl, *a*, plays, by which the cam E can be fixed in the desired position to which it may be set.

*b* is a brace-bar that strengthens the beam where it is curved, and with another one placed on the opposite side of the cam E the beam at this end is thereby secured against lateral play, twisting, &c.

G is a jointed brace-arm that connects with the sled-frame at *c* and with the beam A at *d*. A similar arm connects at these two points on the opposite side of the machine, which is not shown in the drawings. These two arms allow the beam to move up and down and accommodate itself to the uniform surface of the the ground. From the point *d* proceeds out two jointed arms, H H, that carry a flanged pressing-roller, H′, which presses upon the earth over the slit cut by the colter I, and as the flanges are beveled inward, as shown in Fig. 2, the earth is pressed together on the surface, and the surface-water is thus prevented from leaving the land entirely. This roller H′ follows on in rear of the colter and completes the work.

J J′ are two strong bridge-plates that are respectively bolted to the top and bottom surface of the beam A, at or near its rear end, as shown in Fig. 1. Down through these plates and through the beam are cut oblong slots, through which pass a slide-bar, K, and the colter I. These bridges serve to brace and secure the colter I in a rigid, immovable state, and to form a guide for the slide-bar K, that is placed immediately in rear of the colter, as shown. This bar K is arranged so as to be moved up or down by a lever, L, that has its fulcrum on the top of bridge J. This movement can be effected while the machine is in operation, if desirable. The line of draft, instead of being in a line with the beam in the usual manner, is brought under it, M being the draft-chain that passes between the sled-runners and back to the colter, behind which it is attached to the lower bridge, J′. A hook, *e*, on the end of this draft-chain serves to attach this chain to the capstan or oxen chain.

I now come to the tooth and its attachment for regulating the size of the channel made in the ground. This tooth S, taken in a vertical and middle longitudinal plane, is of the shape shown by Fig. 4, and transversely it is at its extreme rear end or heel elliptical. It gradually tapers from the rear end to the point, and its rear portion, *f*, is larger vertically than the front portion, *g*, and from the point *h* of the sole of the tooth is cut a large hole, $i$, that passes up obliquely through the middle of the tooth, as Fig. 4 clearly shows. The edge $h$ is sharp, and cuts the earth left under the front part of the tooth, and conducts it all up through the hole $i$ to the top of the channel, where it is forced into the space or slit made by the colter I and completely fills up this opening. Then, as the machine proceeds along and draws the tooth through the earth, the projecting lip $j$ presses up and smooths the crown of the channel, and renders the walls solidly and nicely compact.

N is a stirrup shaped piece of metal, the side arms of which are recessed into the sides of the tooth, while the top surface conforms to that of the tooth, with a lip, $m$, projecting out from behind. This piece N is attached to the slide-bar K, and is raised or depressed with said bar. The side wings of piece N keep within the grooves in the tooth's sides, while its top part gives greater or less vertical distance through the channel that is cut in the earth.

P is a fin, curved as represented, and so placed and fixed at the angle of the front edge of the colter and the bottom surface of the beam as to cut the roots, sods, grass, &c., on the surface, and thus remove a great amount of draft on the machine by its clogging up at this point, on account of the colter's failing to cut. The fin just described is very important.

This machine is intended to be drawn by a portable capstan, which is shown in the drawings; but as it is a common contrivance for this and other analogous purposes, it is not necessary to describe its construction and operation.

Having thus described my invention, what I claim as new, and desire to secure by Letters Patent, is—

The adjustable saddle N, in combination with the mole-tooth and its colter I, arranged and operating in the manner and for the purposes herein set forth.

C. W. STAFFORD.

Witnesses:
W. H. CLUNE,
E. E. GAY.